No. 880,241. PATENTED FEB. 25, 1908.
S. PERCIVAL.
PACKAGE TIE.
APPLICATION FILED JAN. 9, 1907.
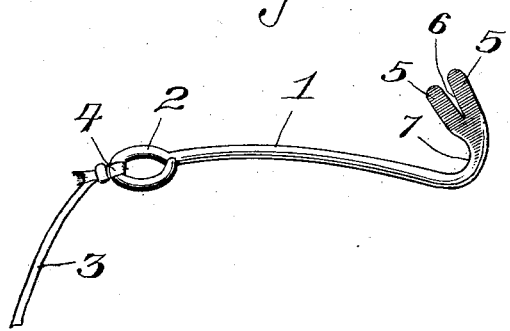
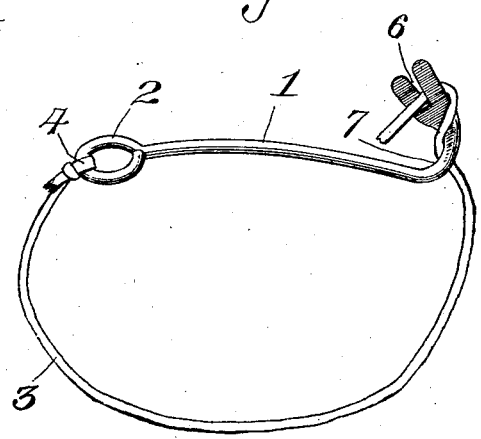
Inventor
Spencer Percival,
Witnesses
By Victor J. Evans
Attorney
THE NORRIS PETERS CO., WASHINGTON, D. C.

UNITED STATES PATENT OFFICE.

SPENCER PERCIVAL, OF NORTH PENDER ISLAND, BRITISH COLUMBIA, CANADA.

PACKAGE-TIE.

No. 880,241.  Specification of Letters Patent.  Patented Feb. 25, 1908.

Application filed January 9, 1907. Serial No. 351,520.

*To all whom it may concern:*

Be it known that I, SPENCER PERCIVAL, a subject of the King of Great Britain, residing at North Pender Island, in the Province of British Columbia and Dominion of Canada, have invented new and useful Improvements in Package-Ties, of which the following is a specification.

This invention relates to package ties designed for the purpose of compressing and tying shocks of corn, or for fastening the ends of grain bags, or for use in doing up bundles, parcels or packages of goods, and one of the principal objects of the invention is to provide a device of simple construction in which means are provided for tightening the cord around the bundle or shock and securing the free end of the cord to the fastener in a reliable manner. This and other objects may be attained by means of the construction illustrated in the accompanying drawing, in which:

Figure 1 is a side elevation of a package tie designed for the purpose of compressing and tying shocks of corn or other grain. Fig. 2 is a view showing the tying cord or rope secured to the fastener.

Referring to the drawing for a more particular description of my invention, the numeral 1 designates the shank portion of a fastener provided at one end thereof with an eye 2 to which a cord or rope 3 is secured by an ordinary knot 4. At the opposite end of the shank 1 the round rod or wire is flattened and provided with a pair of diverging members 5 and an intermediate V-shaped space 6. The diverging members 5 of the fastener extend at an angle to the shank 1 to provide a rounded bearing portion 7 in which the cord 3 is pulled, the rounded portion 7 serving as a pulley for tightening the cord, after which the terminal end of the cord is brought around and passed between the two members 5 in the V-shaped opening 6 where the cord is clamped in place.

A device made in accordance with my invention will be found very efficient for securing ropes or cords around shocks of corn or in tying bags, parcels, or bundles.

Having thus described the invention, what I claim is:

The herein described package tie made from a single piece of wire and consisting of a shank portion having a cord-securing eye at one end, and the opposite end being flattened and provided with a V-shaped notch in the outer edge of said flattened portion, a neck between said flattened portion and the shank, said neck being rounded to provide a smooth bearing surface for adjusting the cord.

In testimony whereof, I affix my signature in presence of two witnesses.

SPENCER PERCIVAL.

Witnesses:
 JOHN WILLY,
 J. AUCHTERLONIE.